United States Patent
Zimmerman et al.

(10) Patent No.: US 10,733,448 B2
(45) Date of Patent: Aug. 4, 2020

(54) MACHINE LEARNING OF CONTEXT DATA FOR SOCIAL AND CONTEXTUAL SCENE INFERENCES

(71) Applicant: Microsoft Technology Licensing, LLC, Redmond, WA (US)

(72) Inventors: Zachary T. Zimmerman, Seattle, WA (US); Alex Jungyeop Woo, Bellevue, WA (US); Donna K. Long, Redmond, WA (US); Julie Hubschman, Seattle, WA (US); Kendall C. York, Bellevue, WA (US); Saqib Shaikh, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 194 days.

(21) Appl. No.: 15/922,367

(22) Filed: Mar. 15, 2018

(65) Prior Publication Data
US 2019/0286910 A1 Sep. 19, 2019

(51) Int. Cl.
G06K 9/00 (2006.01)
G06N 5/04 (2006.01)
H04N 13/261 (2018.01)

(52) U.S. Cl.
CPC ..... *G06K 9/00677* (2013.01); *G06K 9/00335* (2013.01); *G06K 9/00671* (2013.01); *G06K 9/00684* (2013.01); *G06N 5/045* (2013.01); *H04N 13/261* (2018.05)

(58) Field of Classification Search
CPC ........... G06K 9/00677; G06K 9/00671; G06K 9/00335; G06K 9/00684; H04N 13/261; G06N 5/045

USPC .......................................... 382/154
See application file for complete search history.

(56) References Cited

U.S. PATENT DOCUMENTS

| 7,598,976 B2 * | 10/2009 | Sofer ................. G09B 21/006 348/62 |
| 8,498,810 B2 | 7/2013 | Mayer et al. |
| 8,605,141 B2 | 12/2013 | Dialameh et al. |

(Continued)

OTHER PUBLICATIONS

"Microsoft releases AI-powered app to help blind see", Retrieved From: <<https://yourstory.com/2017/07/microsoft-releases-ai-app-help-blind/>>, Jul. 13, 2017, 8 Pages.

(Continued)

*Primary Examiner* — Van D Huynh
(74) *Attorney, Agent, or Firm* — Holzer Patel Drennan (57) ABSTRACT

A system for contextual interpretation of a three-dimensional scene includes an object recognition engine that analyzes scene data collected from the three-dimensional scene to identify at least one object present in the three-dimensional scene. The system further includes a contextual inference engine trained on a context data training set to analyze context of the scene by identifying a potential contextual inference associated in memory with the at least one object identified by the object recognition engine; comparing the scene data to a subset of the context data training set identified as satisfying the potential contextual inference; and outputting scene context information conveying the potential contextual inference responsive to a determination that the scene data and the subset of the context data train set satisfy a predetermined correlation.

18 Claims, 5 Drawing Sheets

(56) References Cited

U.S. PATENT DOCUMENTS

| | | | | |
|---|---|---|---|---|
| 2014/0247343 | A1* | 9/2014 | Chen | G02B 27/017 |
| | | | | 348/135 |
| 2017/0064363 | A1* | 3/2017 | Wexler | G06K 9/00255 |
| 2017/0286383 | A1* | 10/2017 | Koul | G06F 3/048 |
| 2018/0285632 | A1* | 10/2018 | Sonoda | G06K 9/00335 |
| 2019/0042900 | A1* | 2/2019 | Smith | G06K 9/726 |

OTHER PUBLICATIONS

Bourbakis, Nikolaos "Sensing Surrounding 3-D Space for Navigation of the Blind", In Proceedings of the IEEE Engineering in Medicine and Biology Magazine, vol. 27, Issue 1, Jan. 2008, 7 Pages.

Hardesty, Larry "Wearable system helps visually impaired users navigate", Retrieved From <<https://www.csail.mit.edu/news/wearable-system-helps-visually-impaired-users-navigate>>, May 31, 2017, 5 Pages.

Pardes, Arielle "The Wearables Giving Computer Vision to the Blind", Retrieved From: <<https://www.wired.com/story/wearables-for-the-blind/>>, Jul. 20, 2017, 12 Pages.

Sawant, Nimish "The Drishti app attempts to help the visually impaired make sense of their surroundings", Retrieved From: <<http://www.firstpost.com/tech/news-analysis/the-drishti-app-attempts-to-help-the-visually-impaired-make-sense-of-their-surroundings-3701961.html>>, Apr. 28, 2017, 9 Pages.

\* cited by examiner

MACHINE LEARNING OF CONTEXT DATA FOR SOCIAL AND CONTEXTUAL SCENE INFERENCES

BACKGROUND

In recent years, machine learning has been utilized to develop a number of robotic tools that mimic human sensing capability. For example, voice-to-text translation technologies enable hearing-impaired individuals to read what they cannot hear. Similarly, there exist automated narration technologies designed to assist vision-impaired individuals by conveying audio descriptions of what is captured with a camera. One major limitation with these technologies is that they lack the functionality to deliver the type of contextual inferences that humans naturally form instinctually when they process sensed information in context. For instance, vision-assist artificial intelligence technologies may be usable to strictly describe the imagery of a scene (e.g., what objects are present and where they are). If described well enough, the user may be able to form contextual inferences based on the received descriptions, but perhaps not without significant time listening to a lengthy description. Many common every-day tasks are onerous and difficult to perform without the ability to quickly act on contextual inferences.

SUMMARY

According to one implementation, a system includes an object recognition engine and a contextual inference engine. The object recognition engine analyzes scene data collected from the three-dimensional scene to identify at least one object present in the three-dimensional scene. The contextual inference engine is trained on a context data training set to analyze context of the scene by identifying a potential contextual inference associated in memory with the at least one object identified by the object recognition engine, comparing the scene data to a subset of the context data training set identified as satisfying the potential contextual inference, and outputting the scene context information conveying the potential contextual inference responsive to a determination that the scene data and the subset of the context data train set satisfy a predetermined correlation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

The herein disclosed technology facilitates machine-automated interpretation of data sensed from 3D scene (e.g., imagery, sound) to identify contextual inferences of the sort likely to be made by a human interpreting the scene data. For example, the disclosed technology may be utilized to provide daily assistance to a sense-impaired individual, such as to allow a vision-impaired individual to quickly identify the viability of objects for potential user interactions (e.g., 'is the chair available to sit in?' or 'is it safe to pet the dog?). Additionally, the disclosed technology may help such an individual to identify motivations for human and animal behaviors (e.g., 'is the person is angry' or 'is the bird dangerous?').

This use of machine learning to attribute meaning to a scene—as opposed to merely describing the scene—may facilitate more informed decision-making and in some cases, quicker responsive actions, by either robots or humans. Using machines to identify and convey contextual-inferences can allow sense-impaired individuals to more easily navigate and seamlessly interact with their surroundings, react to otherwise unnoticed social and behavioral clues, and take quick precautions to avoid dangerous situations.

Many of the examples disclosed herein are specific to contextual inferences based on machine analysis of imagery. It may be appreciated, however, that the same or similar core technology may be implemented to enable machine identification of contextual inferences based on a variety of different types of scene data that can be sensed in different ways (either by human senses or otherwise), such as heat, sound, color (RGB), LIDAR, RADAR, Wi-Fi connectivity, or any combination thereof.

Figure 1:
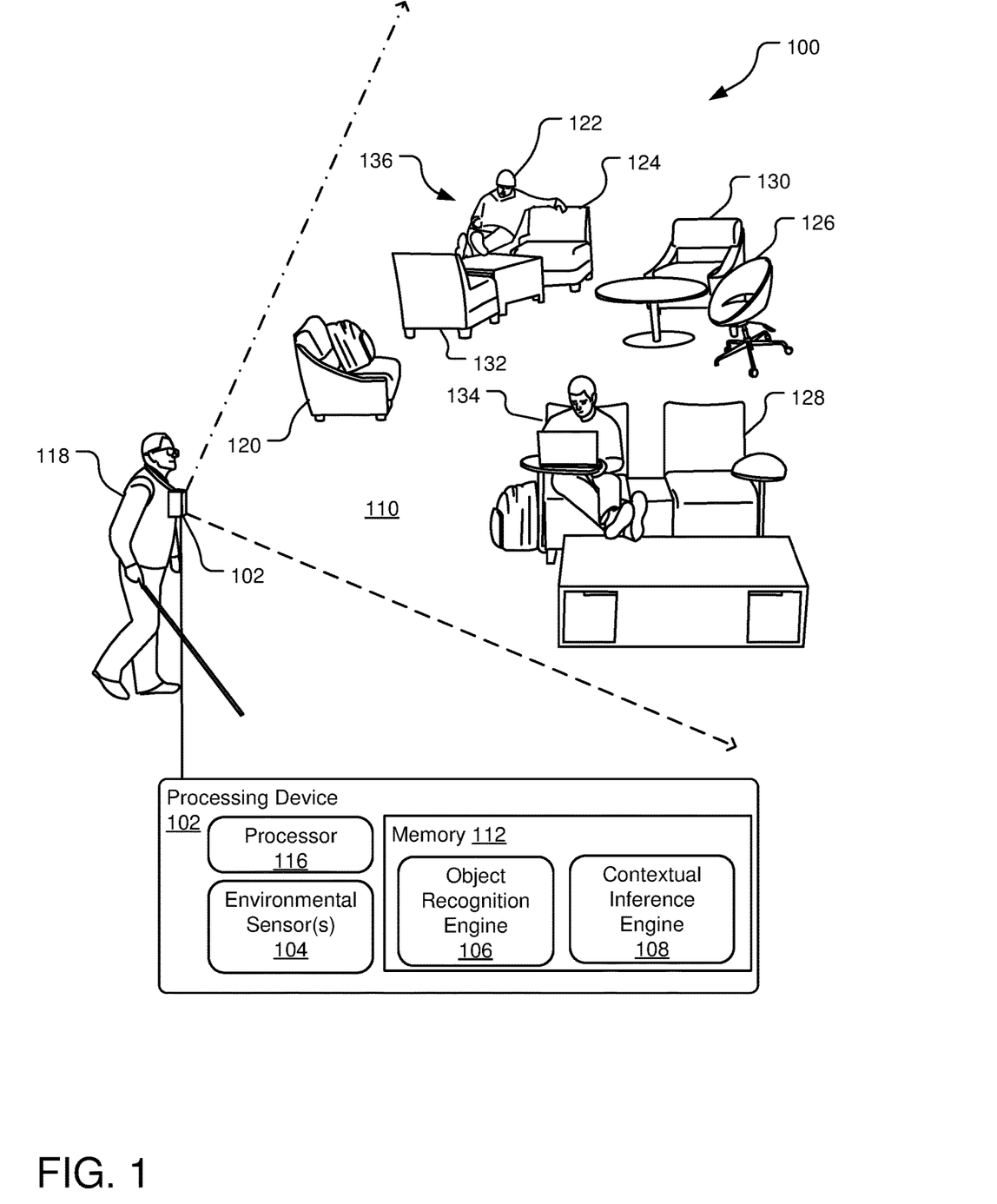
FIG. 1 illustrates scene interpretation of an example contextual inference analysis system.

FIG. 1 illustrates scene interpretation of an example contextual inference analysis system 100. The system includes a processing device 102 with one or more environmental sensors 104 for collecting scene data from local surroundings (e.g., from a scene 110). As used herein, the term "scene data" is used to refer to sensory data collected from a three-dimensional scene as well as data derived based on analysis of such sensory data. For example, scene data may include without implementation imagery (e.g., collected by a video or camera), a depth map (e.g., compiled by a depth mapping utilizing LIDAR or other depth-mapping technology); infrared data and/or infrared maps prepared from collected infrared data, and sound data. The environmental sensors 104 may assume a variety of forms in different implementations and may include hardware, software, or a combination of software and hardware.

In FIG. 1, the processing device 102 is shown to be incorporated into a wearable electronic device worn by a visually-impaired user 118. This is meant to illustrate one of many exemplary uses for the technology. In one implementation, the processing device 102 is integrated within an autonomous vehicle or robot. For example, an autonomous vehicle or robot may execute decisions based on outputs of the contextual inference analysis system 100 such as decisions for navigating, operating weaponry, etc. Depending on the specific use implementation, the processing device 102 may take on a variety of forms including without limitation various hand-held mobile devices (e.g., a phone, tablet, laptop computer), wearable devices, smart accessories, and/or control system electronics integrated into larger robotic systems (such as in the case of an autonomous vehicle or robot). The processing device 102 includes at least a processor 116 and memory 112 storing various applications. In FIG. 1, the memory 112 is shown to include an object recognition engine 106 and a contextual inference engine 108. In some implementations, one or more aspects of the object recognition engine 106 and the contextual inference engine 108 are executed by processor(s) external to the processing device 102 (e.g., by a cloud-based service provider).

The object recognition engine 106 and the contextual inference engine 108 employ supervised machine learning intelligence to make various inferences about the scene data that is collected by the environmental sensors 104. The object recognition engine 106 analyzes the scene data to identify objects that are present in the scene 110. Unless stated otherwise, the term "objects" is used herein to refer to both living and non-living subjects that may appear in a scene. In one implementation, the object recognition engine 106 includes object-recognition logic developed based on a training dataset including object imagery and known outcomes associated with different images (e.g., images that are known to be either "dog" or "not a dog" that can statistically be used to identify a dog). The training dataset may be developed using supervised learning, unsupervised learning, reinforcement learning, or other machine learning techniques.

For each object positively identified in the scene 110 by the object recognition engine 106, the contextual inference engine 108 may identify one or more potential contextual inferences that are associated in memory of the processing device 102 (e.g., in a database, table, etc.) with the object. For example, an object "dog" may be associated in memory with a number of contextual inferences relating to the emotion or well-being of the dog (e.g., is the dog happy?) as well as potential safety hazards posed by the dog (e.g., "is it safe to pet the dog?"). The contextual inference engine 108 assesses a context in which each object is captured within the scene data (e.g., relative to other living and non-living objects, actions and expressions of living objects, etc.), such as to analyze the object's association with other identified objects as well as actions or body language of the object (if the object is living). Using such information, the contextual inference engine 108 identifies contextual inferences that a human would naturally understand based on a reasonable assessment of the scene 110.

As used herein, the term "contextual inference" refers to more than merely a description or literal translation of scene data (e.g., more than a spoken description of imagery or a written description sound) collected from the scene 110. Rather, a contextual inference is a conclusion that is drawn based one or more objects in relation to other objects and/or a conclusion based on actions performed by one or more objects. Several examples of contextual inferences are provided herein.

The contextual inference engine 108 identifies contextual inferences by analyzing context data associated with living and non-living objects in the scene 110. In one implementation, the contextual inference engine 108 is trained on examples of context data predefined as either satisfying or not satisfying certain contextual inferences. As used herein, "context data" refers to data conveying associations between different objects in the scene or activities occurring within the scene 110. For example, context data may include visual associations between objects, such as where the objects are, how the objects are positioned relative to one another, or how each object is interacting with one or more other objects. By recognizing inferences based on this type of context data, users can be provided with information that allows for a richer understanding of the scene.

Context data may also include imagery that captures facial expressions, body language, or body positions. For example, certain hand gestures when combined with lowered eyebrows may be usable to make a contextual inference "possible anger." Likewise, a partially-open mouth may indicate a person is trying to speak, particularly if the person is standing next to another person and they are facing one another and/or exhibit other signs that they are engaging in conversation. In the case where the data collected from the scene 110 includes sound data, the context data may additionally or alternatively include auditory associations between sounds or between sounds and images, such as the volume or tone differences between sounds or pairings between sounds and objects usable to determine sources of different sounds.

In one implementation, the contextual inference engine 108 employs logic developed based on a context data training dataset that includes both imagery and known outcomes associated with different contextual inferences and scene data (e.g., images or sounds). For example, the contextual inference engine 108 may be trained on images of "dangerous dogs" and "friendly dogs" that can be used to read body language of a dog and predict, with statistical accuracy, whether a dog is likely to be dangerous.

In the contextual inference analysis system 100, the contextual inference engine 108 identifies potential contextual inferences associated with objects identified in the scene and further assesses confidence in the reasonability of each one of the identified potential contextual inferences. For example, the contextual inference engine 108 compares the scene data collected by the environmental sensors 104 to a subset of the context data training set identified as satisfying one of the potential contextual inferences. When this comparison yields a predefined correlation, the contextual inference is identified as a reasonable inference and conveyed via one or more forms of output to the user 118.

In an example illustrated in FIG. 1, the user 118 of the contextual inference analysis system 100 uses system outputs to navigate the scene 110 and to find an available chair to sit in. Even though there are several chairs in the scene, finding an available chair as not as simple as identifying a chair or even an empty chair. For example, a chair 120 has a backpack on it, which may mean that the chair is claimed or being saved for someone. Likewise, another chair 124 is empty, but there is a man 122 in an adjacent chair with his arm outstretched along the back of the chair 124. In context, a reasonable person may take this as a sign that the chair 124 is "not available," especially if there exist other empty chairs in the room. Yet another chair 126 is tilted forward and missing a front wheel. While this chair is technically "available," a reasonable person might infer that this chair not a best candidate for a seat because it looks uncomfortable and/or may pose a danger.

In this situation, the object recognition engine 106 recognizes each of several chairs in the scene 110 (e.g., the chairs 120, 124, 126, 128, 130, 132, 134, and 136 (occupied by the man 122). The contextual inference engine 108 identifies a saved potential contextual inference "available chair?" in association with "chair," and begins assessing the scene 110 to identify what chairs are reasonably "available."

In some implementations, the processing device 102 may accept one or more forms of user input (e.g., voice, keyboard, touch input) to instruct the contextual inference analysis system 100 with a specific task or challenge for which the user 118 requests assistance. For instance, the user 118 may type or speak an instruction to inform the contextual inference engine 108 that they are looking for an available chair. In other cases, the contextual inference engine 108 autonomously identifies and evaluates contextual inferences without receiving user input.

For each one of the chairs in the scene 110, the contextual inference engine 108 compares the scene data to a subset of its context data training set predefined as satisfying the potential contextual inference ("available chair"). Based on this comparison, the contextual inference engine 108 calculates a confidence in the applicability of the potential contextual inference to each chair in the scene 110 (e.g., a statistical likelihood that the potential contextual inference can reasonably be drawn based on the training dataset). The contextual inference engine 108 identifies the chairs 128, 130, and 132 as available chairs and conveys this information to the user 118, such as by guiding the user 118 to a nearest one of the available chairs or to an available chair near recognized friends or other acquaintance(s) of the user 118.

In different implementations, the contextual inference analysis system 100 may convey scene context information to the user 118 in different forms. In one implementation where the contextual inference analysis system 100 collects visual imagery (as in the illustrated example), the scene context information may be provided to a user in auditory form, such as in the form of a narration describing the identified contextual inferences applicable to the scene. For example, the contextual inference analysis system 100 may verbally guide the user 118 to the identified available chair. In another implementation, the contextual inference analysis system 100 outputs the scene context information in the form of haptic feedback or non-verbal sounds, such as vibrations of varied intensity or beeps of variable tone to convey information to the user 118. In another implementation, the contextual inference engine 108 assesses contextual inferences based on sound data and collections of sounds. In this case, the scene context information may be provided to the user 118 visual form, such as text or imagery on a display of the electronic device.

Depending on the specific machine learning solutions utilized to implement the disclosed technology, the object recognition engine 106 may or may not be included in the contextual inference analysis system 100. For example, the contextual inference engine 108 may be trained to self-identify contextual inferences without receiving inputs that identify specific objects for evaluation in association with potential contextual inferences.

Figure 2:
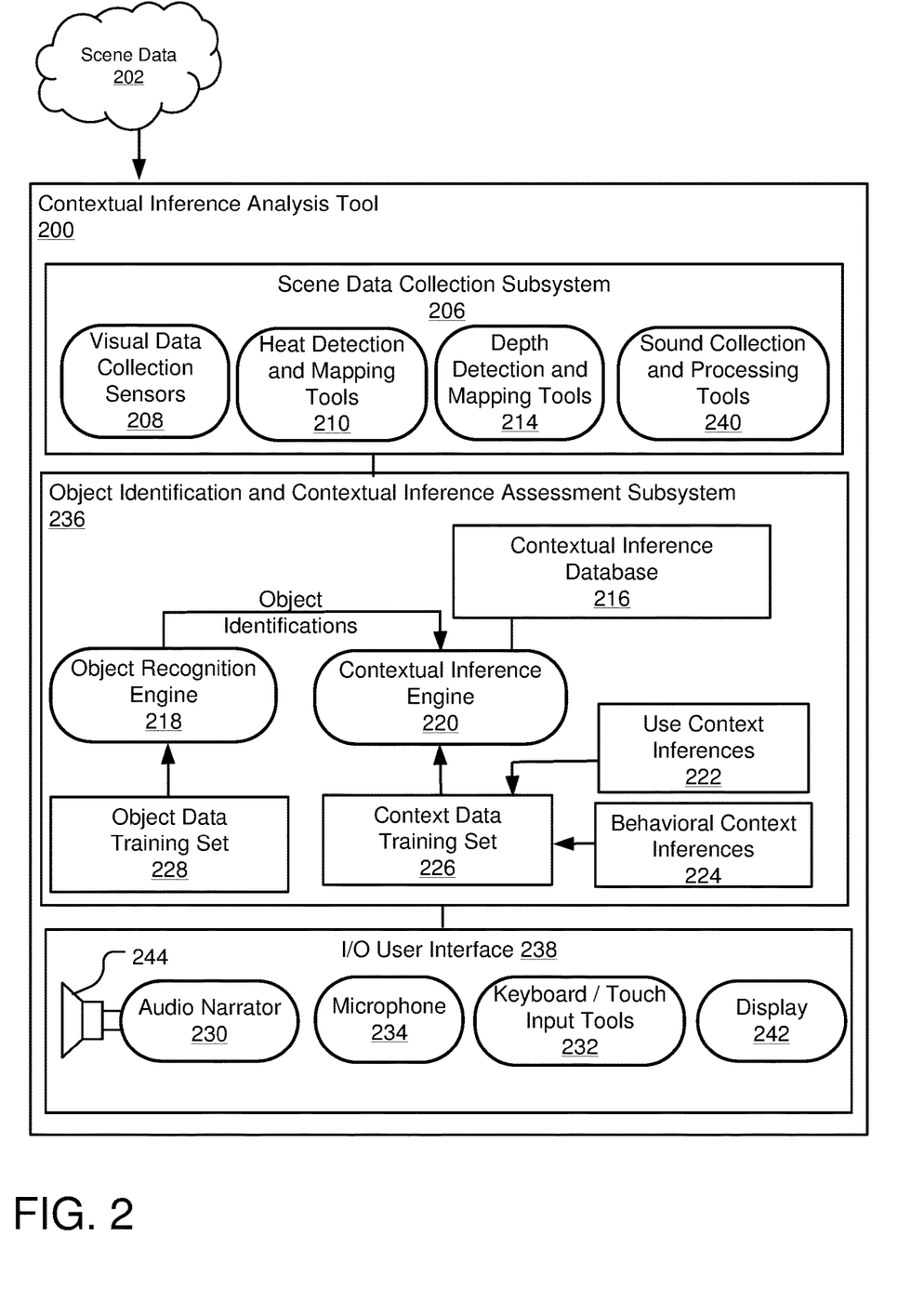
FIG. 2 illustrates an example contextual inference analysis tool for analyzing a three-dimensional scene.

FIG. 2 illustrates an example contextual inference analysis tool 200 that includes a scene data collection subsystem 206, object identification and contextual inference assessment subsystem 236, and an I/O user interface 328 for conveying system outputs and, optionally, for receiving user inputs, such as user queries related to specific tasks, challenges, or questions about a scene. Each of the scene data collection subsystem 206 and the object identification and contextual inference assessment subsystem 236 may include hardware or software or a combination of hardware and software.

The various sensors and processing tools of the scene data collection subsystem 206 may vary in different implementations depending on the specific purpose of the contextual inference analysis tool 200 (e.g., assistance to visually-impaired v. hearing-impaired individuals). Consequently, the scene data collection subsystem 206 may include fewer or greater components or different components in addition to or in lieu of those shown. In FIG. 2, the scene data collection subsystem 206 includes visual data collection sensors 208 (e.g., one or more cameras), heat detection and mapping tools 210, depth detection and mapping tools 214, and sound collection and processing tools 240, all of which serve to collect various types of scene data 202 from a surrounding environment.

Once collected, the scene data 202 is provided to the object identification and contextual inference assessment subsystem 236. In some implementations, the object identification and contextual inference assessment subsystem 236 additionally receives user input through the I/O user interface 238, such as inputs through a microphone 234 or through a keyboard/touch inputs tools 232. For example, a user may identify a specific task that the contextual inference analysis tool 200 is capable of assisting with by way of analyzing and identifying contextual inferences from the scene data 202.

The object identification and contextual inference assessment subsystem 236 is shown to include object recognition engine 218 and a contextual inference engine 220. In one implementation, the object recognition engine 218 analyzes the scene data 202 (e.g., imagery, mappings of a room) to identify specific objects (e.g., both living and non-living objects), and the contextual inference engine 220 analyzes context data associated with each identified object to identify one or more contextual inferences that may be reasonably formed based on the scene.

In some implementations, the contextual inference analysis tool 200 does not include the object recognition engine 218. For instance, some deep learning models may permit training of the contextual inference engine 220 to self-identify contextual inferences without first receiving inputs that identify specific objects within a scene. Additionally, in implementations designed to assist the hearing-impaired, the contextual inference engine 220 may make contextual inferences based on sounds without any analysis based on visual data and/or without identifying specific objects in a scene. In still another implementation, the object recognition engine 218 identifies objects from imagery and the contextual inference engine 220 analyzes the imagery in the context of sounds also detected by the scene data collection subsystem to identify contextual inferences based on combinations of sounds and images.

In one implementation, the object recognition engine 218 and contextual inference engine 220 implement a machine learning model, such as a model trained to classify using supervised learning, unsupervised learning, reinforcement learning, other machine learning techniques or any combination therefore. Various techniques employed may utilized learning from artificial neural networks of various types including without limitation convolutional neural networks, regions with convolutional neural networks (R-CNN), and recurrent neural networks.

The object recognition engine 218 includes a model trained on an object data training set 228. For example, the object data training set 228 includes positive and negative examples of several different objects, and these positive and negative examples are usable to identify new instances of each object with a statistically significant degree of accuracy. In one implementation, the object data training set 228 is training dataset developed through supervised machine learning techniques. In other implementations, the object data training set 228 is developed through unsupervised learning, reinforcement learning, or other machine learning techniques.

In the illustrated implementation, the object recognition engine 218 identifies objects in the captured scene data 202 and provides identifications of these objects to the contextual inference engine 220.

Responsive to receipt of the identified objects from the object recognition engine 218, the contextual inference engine 220 identifies relevant potential contextual inferences having identifiers stored within a contextual inference database 216. For example, the contextual inference database 216 includes a table of contextual inference identifiers each pre-identified as having associations within one or more object types. For each object identified by the object recognition engine 218, the contextual inference engine 220 identifies associated contextual inferences from the contextual inference database 216 as being "potential contextual inferences," and then analyzes each of the identified associated potential contextual inferences to evaluate applicability to the scene data 202. In implementations where the user provides input through the I/O user interface 238, the contextual inference engine 220 may identify the potential contextual inferences based on user input and/or a combination of user input and the object identifications from the object recognition engine 218.

Like the object recognition engine 218, the contextual inference engine 220 also includes a learning model. This model is not trained on object data (e.g., positive and negative instances of different objects); but instead, trained on a context data training set 226 including positive and negative instances pre-identified as satisfying or not satisfying each of several (e.g., thousands of) contextual inferences. In one implementation, the context data training set 226 is developed through supervised machine learning techniques. In other implementations, the context data training set 226 is developed through unsupervised learning, reinforcement learning, or other machine learning techniques. The context data training set 226 includes context data pertaining to two primary categories of contextual inferences—use context inferences 222 and behavioral context inferences 224.

The term "use context inferences" is used herein to refer to a category of contextual inferences that may help a user to interact with an object and/or evaluate viability of a particular object for a potential user-object interaction. For example, one use context inference may indicate that a particular chair is available to sit in. Another example use context inference may pertain to the accessibility of a location, such as door. For example, the contextual inference engine 220 may receive "door" as an input and further evaluate an image of the door, which includes a red "occupied" sign in combination with male or female restroom logo. From this, the contextual inference engine 220 may return one or more contextual inferences, such as "the door is a bathroom door" and/or the "bathroom is temporarily unavailable."

Other use contexts may serve to facilitate other interactions between the user and the objects in the scene. For example, a user may utilize the microphone 234 or keyboard/touch input tools 232 to indicate the desire to "find the end of the queue" (e.g., a line). In response, the contextual inference engine 220 instructs the user to slowly move a camera until it identifies an image that it is able to positively identify as satisfying the contextual inference "end of the queue." In this case, the contextual inference engine 220 outputs scene context information through the I/O user interface 238 in a format that helps the user to "find the end of the queue."

In contrast to use context inferences, the term "behavioral context inferences" is used herein to refer to a category of contextual inferences that may help a user to understand a motivation for an action of a living object (e.g., human or animal action) that is captured in the scene data 202. For example, one behavioral context inference may inform a user of an emotion of a person or animal in the scene. In one implementation, the contextual inference engine 220 is trained on imagery that is pre-categorized as conveying a particular emotion. For example, a person rolling their eyes may be bored or annoyed. Dramatic hand gestures can indicate anger or frustration. Still other behavioral context inferences may be made to pre-emptively inform (or warn) a user that an action is about to occur. For example, a dog showing his teeth may be about to snap or attack ("dangerous dog"). Still other behavior context inferences may inform a user about the intentions of others. For example, a raised hand in a meeting may be used to reasonably infer that someone wants to ask a question. The contextual inference engine 220 may be trained on a vast number of behavioral context inferences and use context inferences in addition to those examples above.

After identifying potential contextual inferences based on user input and/or the object identifications from the object recognition engine 218, the contextual inference engine 220 assesses each potential contextual inference to evaluate a confidence in the applicability of the potential contextual inference to the scene data. For example, the contextual inference engine 220 may calculate a confidence metric that indicates a likelihood that the scene data satisfies a defined correlation with a subset of the context data training set 226 pre-identified as satisfying the potential contextual inference. When the confidence metric satisfies a predetermined confidence threshold (e.g., greater than 90%), the contextual inference engine 220 outputs scene context information through the I/O user interface 238 to alert the user of the contextual inference. In some implementations, the contextual inference engine 220 may provide outputs signifying the computed confidence level as well (e.g., "the person is possibly angry" as opposed to "the person is violent").

Output of the contextual inference engine 220 may be provided in different ways depending largely on the specific design purpose of each implementation. In systems designed to assist visually-impaired individuals, output may be delivered through a speaker 244 and generated by an audio narrator 230. In implementations designed to assist hearing-impaired individuals, output may be presented on a display 242.

Figure 3:
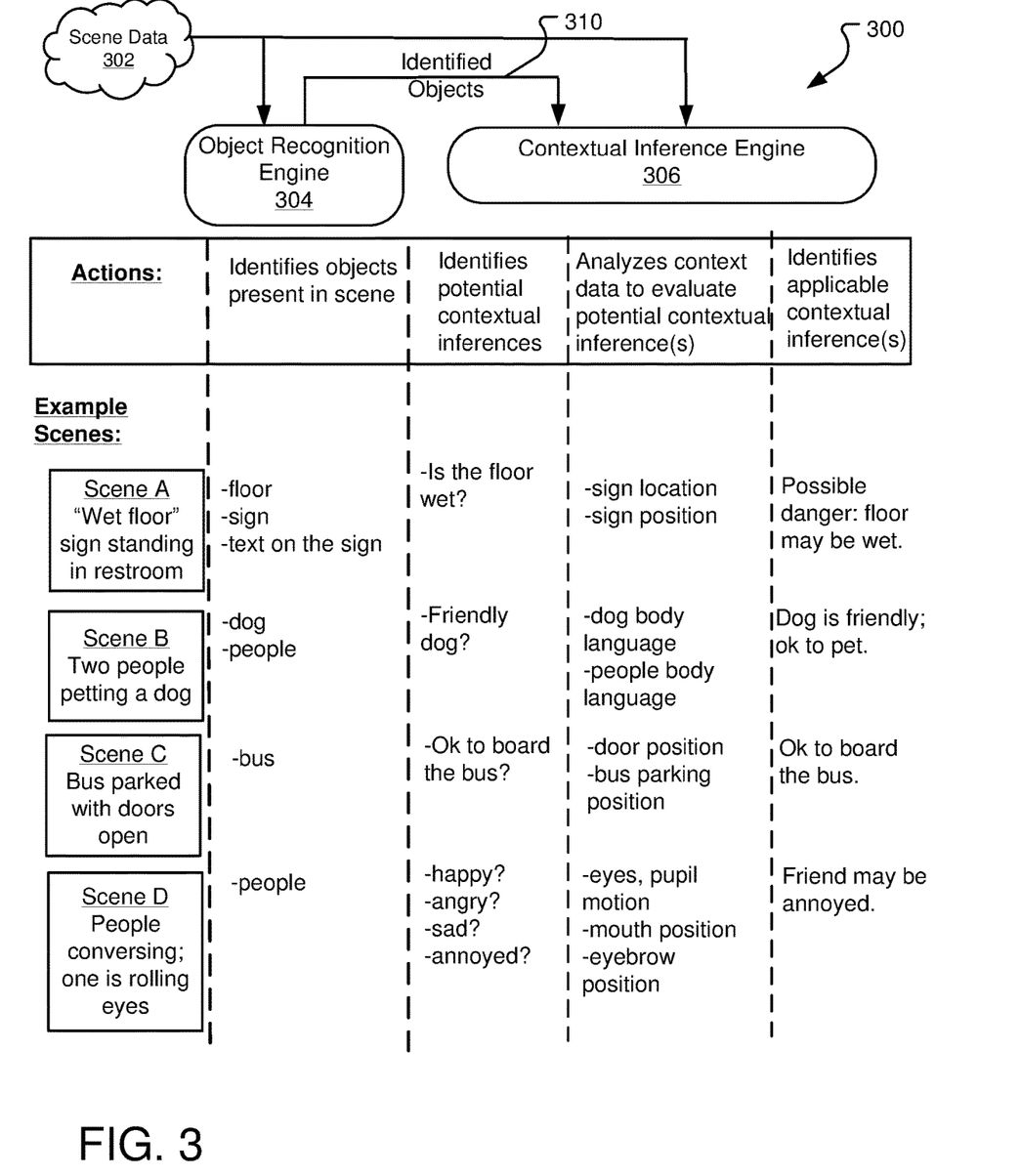
FIG. 3 illustrates exemplary actions performed by another contextual inference analysis system.

FIG. 3 illustrates exemplary actions performed by another contextual inference analysis system 300. The system includes an object recognition engine 304 and a contextual inference engine 306, which receive and analyze scene data 302 (e.g., imagery, sounds, mappings of a room) collected from a three-dimensional scene.

The object recognition engine 304 analyzes the scene data 302 to identify specific objects (e.g., both living and non-living objects) and provides the identified objects 310 to the contextual inference engine 306. In turn, the contextual inference engine 306 identifies potential contextual inferences that are stored in memory in association with one or more of the identified objects 310. In some implementations, the contextual inference engine 306 also receives user input (e.g., voice data, keypad input) and uses this input in addition to or in lieu of the identified objects 310 to identify the potential contextual inferences. For each identified potential contextual inference, the contextual inference engine 306 compares the scene data 302 with training data pre-defined as satisfying the potential contextual inference and uses this comparison to evaluate whether or not the potential contextual inference is reasonably applicable to the scene data 302.

Example actions and outputs of the object recognition engine 304 and contextual inference engine 306 are represented in FIG. 3 with respect to four different examples scenes (A-D). In the illustrated examples, the scene data 302 includes imagery; however, it may be understood that the same or similar techniques can be implemented to construct a contextual inference engine 306 that makes contextual inferences based on sound data or on a combination of imagery and sounds or other types of sensory data.

The first example scene, Scene A, includes a "Wet Floor" sign standing in a restroom. The object recognition engine 304 identifies objects in the scene including "floor," "sign," and may also identify text on the sign or even identify the sign as a "wet floor sign." The contextual inference engine 306, in turn, identifies a potential contextual inference "warning: slippery floor!" and performs an analysis of context data associated with one or more of the floor, sign, or other objects in the room to determine whether it is indeed appropriate to convey the warning to a user. For example, the contextual inference engine 306 may be trained to recognize that a wet floor sign leaning up against a wall means the floor is unlikely to be wet, while a wet floor sign that is standing and in the middle of the room is a much better indicator that the floor is indeed wet. By comparing this training data with the context data of scene A, the contextual inference engine 306 calculates, with confidence, that the floor is wet.

The second example scene, Scene B, includes a dog and two people. The object recognition engine 304 identifies the dog and the two people. The contextual inference engine 306, in turn, identifies a potential contextual inference that may be of interest to a user ("friendly dog?"). In one implementation, the user provides voice or keyboard input to convey an interest in petting the dog. In either case, the contextual inference engine 306 identifies "friendly dog" as being a potential contextual inference relevant to the query. The contextual inference engine 306 performs analysis of the potential contextual inference based on context data (e.g., dog body language, people body language), determines that the dog is friendly, and conveys this contextual inference as output to a user (e.g., "the dog is friendly"; or "it is ok to pet the dog").

The third example scene, Scene C, includes a bus parked with its doors open. object recognition engine 304 identifies the bus. The object recognition engine 304 identifies objects in the scene including the dog and the two people. The contextual inference engine 306, in turn, identifies a potential contextual inference that may be of interest to a user ("ok to board the bus?). In one implementation, the user provides voice or keyboard input to convey an interest in boarding the bus. The contextual inference engine 306 performs analysis of the potential contextual inference based on context data (e.g., the door position, the bus parking position (e.g., stopped at red light v. at a curb), determines that the bus is waiting for passengers to board, and conveys this contextual inference as output (e.g., "it is ok to board the bus").

The fourth example scene, Scene D, includes people engaged in conversation. One person is rolling his eyes. The object recognition engine 304 identifies the people. The contextual inference engine 306, in turn, identifies various potential contextual inferences relating to emotion and analyzes context data (e.g., position or motion of pupils, position of eyebrows, mouth position). As a result, the contextual inference engine 306 determines that the pupil movement (eye rolling) satisfies a contextual inference "person is annoyed or bored." The contextual inference engine 306 conveys this contextual inference to a user.

Figure 4:
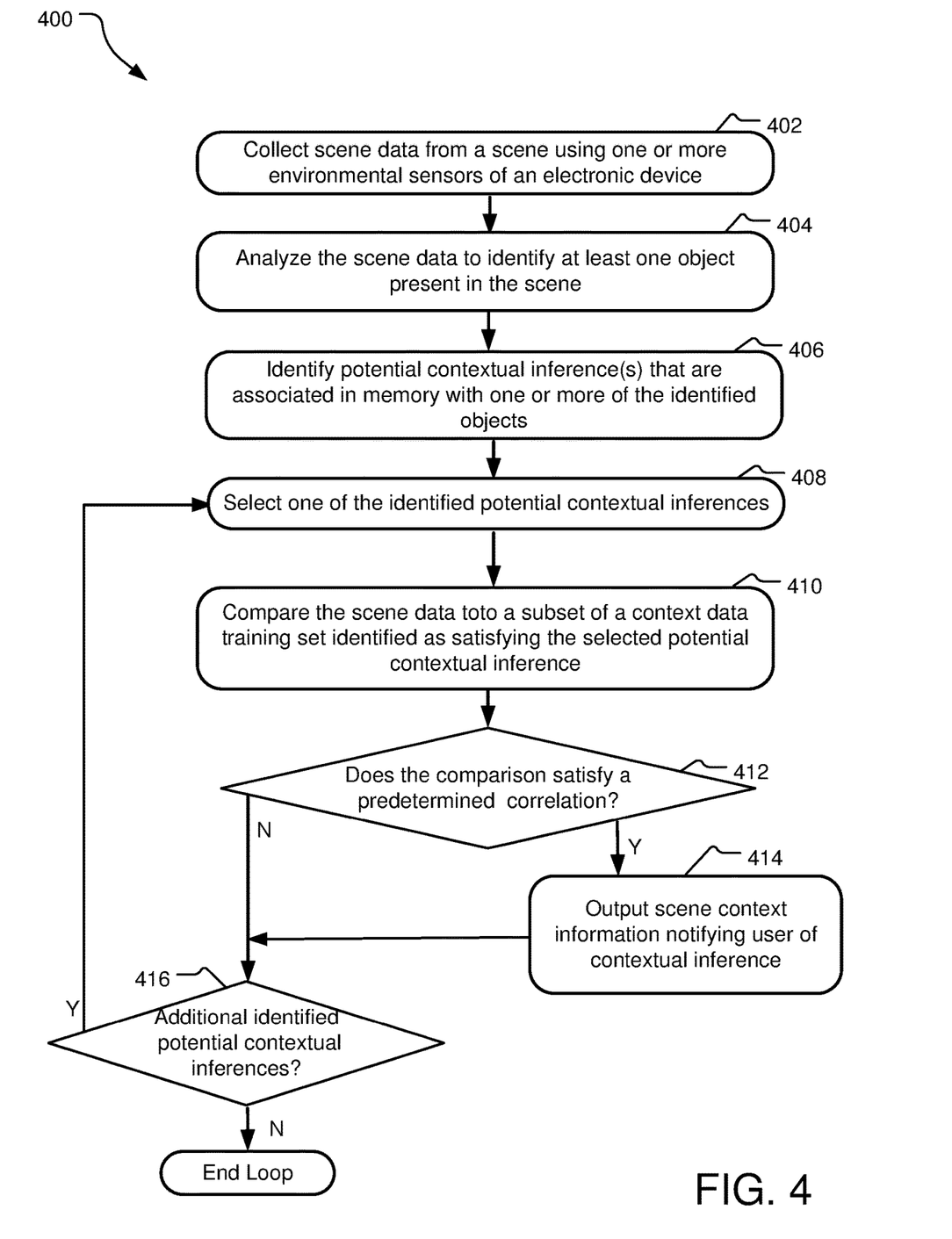
FIG. 4 illustrates example operations for contextual interpretation of a three-dimensional scene.

FIG. 4 illustrates example operations 400 for contextual interpretation of a three-dimensional scene. A collection operation 402 collects scene data from a scene using one or more environmental sensors of an electronic device. An analyzing operation 404 analyzes the scene data collected from the three-dimensional scene to identify at least one object present in the three-dimensional scene. An identifying operation 406 identifies one or more potential contextual inferences associated in memory with the at least one object identified as being present in the scene. A selection operation 408 selects one of the identified potential contextual inferences for contextual analysis, and a comparison operation 410 compares the scene data to a subset of a context data training set identified as satisfying the select potential contextual inference. A determination operation 412 determines whether the scene data and the subset of the context data training set satisfy a predetermined correlation.

In one implementation, the determination operation 412 computes a confidence metric quantifying a likelihood that the scene data and the subset of the context data training subset satisfy the pre-determined correlation and determines the correlation is satisfied when the confidence metric satisfies a threshold value.

When the determination operation 412 determines that the comparison operation 410 yields a result satisfying the predetermined correlation, the potential contextual inference is identified as a reasonable contextual inference and an output operation 414 outputs scene context information that notifies the user of the identified contextual inference.

When the determination operation 412 determines that the comparison operation 410 yields a result that does not satisfy the predetermined correlation, the potential contextual inference is identified as inapplicable (e.g., unreasonable), and a determination operation 416 determines whether there exist other potential contextual inferences that have been identified as associated with one or more objects in the scene but have not yet been selected by the selection operation 408. If such additional identified potential context inference(s) do exist, the selection operation 408 selects another one of the identified potential contextual inferences and the operations 408-412 repeat until each of the identified potential contextual inferences has been selected and analyzed as described above.

Figure 5:
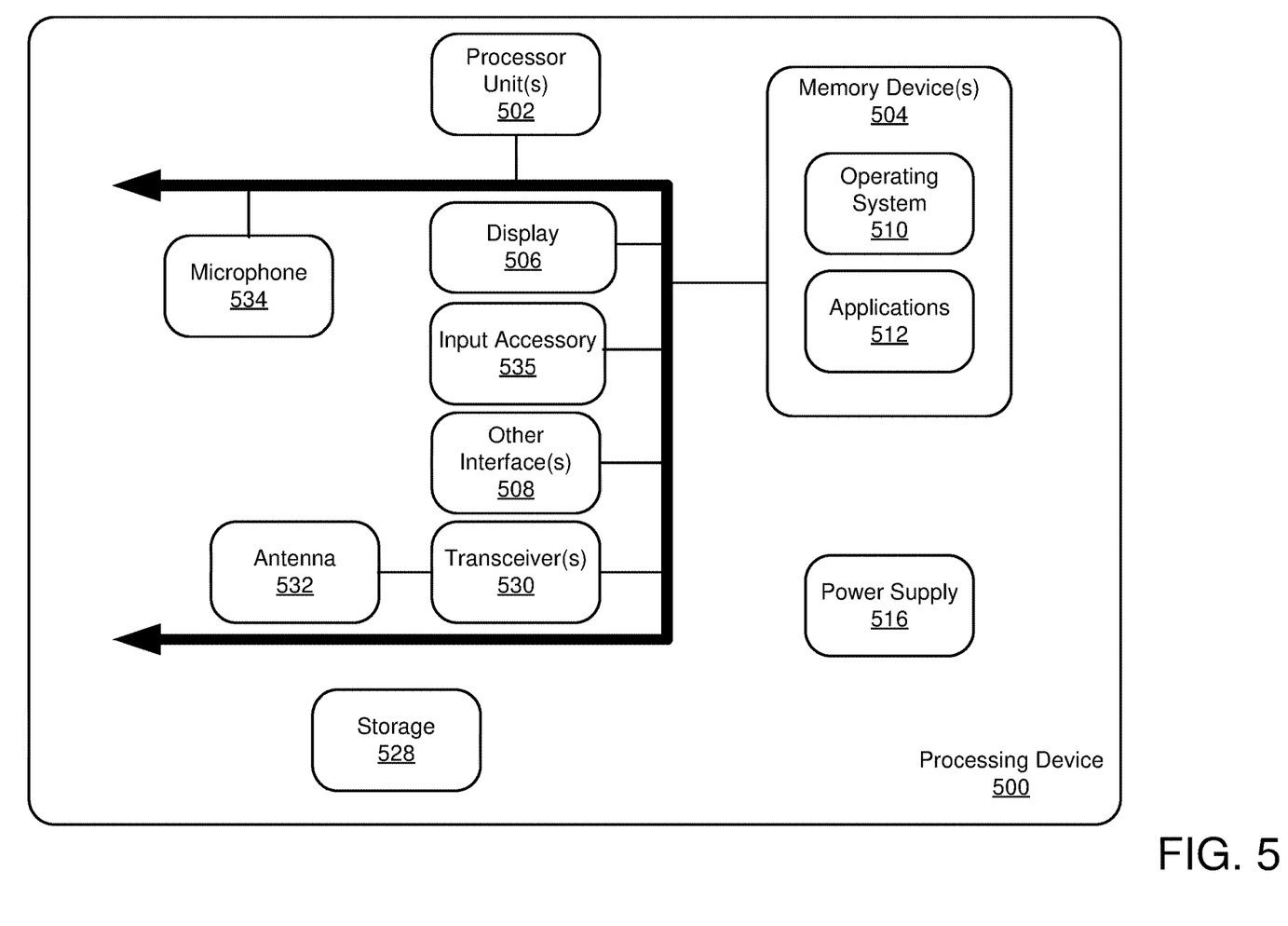
FIG. 5 illustrates an example schematic of a processing device suitable for implementing aspects of the disclosed technology.

FIG. 5 illustrates an example schematic of a processing device 500 suitable for implementing aspects of the disclosed technology. The processing device 500 includes one or more processor unit(s) 502, memory 504, a display 506, and other interfaces 508 (e.g., buttons). The memory 504 generally includes both volatile memory (e.g., RAM) and non-volatile memory (e.g., flash memory). An operating system 510, such as the Microsoft Windows® operating system, the Microsoft Windows® Phone operating system or a specific operating system designed for a gaming device, resides in the memory 504 and is executed by the processor unit(s) 502, although it should be understood that other operating systems may be employed.

One or more applications 512, such as an object recognition engine (e.g., the object recognition engine 106 of FIG. 1) or a contextual inference engine (e.g., the contextual inference engine 108 of FIG. 1) are loaded in the memory 504 and executed on the operating system 510 by the processor unit(s) 502. The applications 512 may receive input from various input devices such as a microphone 534 or input accessory 535 (e.g., keypad, mouse, stylus, touchpad, gamepad, racing wheel, joystick). The processing device 500 includes a power supply 516, which is powered by one or more batteries or other power sources and which provides power to other components of the processing device 500. The power supply 516 may also be connected to an external power source that overrides or recharges the built-in batteries or other power sources.

The processing device 500 includes one or more communication transceivers 530 and an antenna 532 to provide network connectivity (e.g., a mobile phone network, Wi-Fi®, Bluetooth®). The processing device 500 may also include various other components, such as a positioning system (e.g., a global positioning satellite transceiver), one or more accelerometers, one or more cameras, an audio interface (e.g., a microphone 534, an audio amplifier and speaker and/or audio jack), and storage devices 528. Other configurations may also be employed.

In an example implementation, a mobile operating system, various applications (e.g., object recognition engine 106 and contextual inference engine 108, as shown in FIG. 1 above) and other modules and services may have hardware and/or software embodied by instructions stored in memory 504 and/or storage devices 528 and processed by the processor unit(s) 502. The memory 504 may be memory of host device or of an accessory that couples to a host.

The processing device 500 may include a variety of tangible computer-readable storage media and intangible computer-readable communication signals. Tangible computer-readable storage can be embodied by any available media that can be accessed by the processing device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 500. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An example system for contextual interpretation of a three-dimensional scene includes an object recognition engine and a contextual inference engine. The object recognition engine is stored in the memory and executable by the processor to analyze scene data collected from the three-dimensional scene to identify at least one object present in the three-dimensional scene. The contextual inference engine is trained on a context data training set, stored in memory, and executable by a processor to: identify a potential contextual inference associated in memory with the at least one object identified by the object recognition engine; compare the scene data to a subset of the context data training set identified as satisfying the potential contextual inference; an output scene context information conveying the potential contextual inference responsive to a determination that the scene data and the subset of the context data training set satisfy a predetermined correlation.

In another example system according to any preceding system, the potential contextual inference is a use context inference indicating viability of the at least one object for a potential user-object interaction.

In still another example system according to any preceding system the potential contextual inference is a behavioral inference indicating a motivation for an action of a living object captured in the scene data.

In yet another example system according to any preceding system, the contextual inference engine is further executable to: compute a confidence metric quantifying a likelihood that the scene data satisfies a correlation with the subset of the context data training set identified as satisfying the potential contextual inference; and output the scene context information conveying the potential contextual inference responsive to a determination that the computed confidence metric satisfies a predetermined threshold.

In another example system according to any preceding system, the contextual inference engine is further executable identify the potential contextual inference based on a memory association between the potential contextual inference and the at least one object.

In yet another example system according to any preceding system, the context data training set includes instances of context data pre-identified as satisfying or not satisfying each of a plurality of contextual inferences.

In still another example system of any preceding system, the system further includes at least one environmental sensor that collects the scene data from the three-dimensional scene.

In another example system according to any preceding system, the context data includes sound data.

An example computer-readable storage media of a tangible article of manufacture disclosed herein encodes computer-executable instructions for executing on a computer system a computer process for contextual interpretation of a three-dimensional scene. The computer process includes: analyzing scene data collected from the three-dimensional scene to identify at least one object present in the three-dimensional scene; identifying a potential contextual inference associated in memory with the at least one object identified; comparing the scene data to a subset of a context data training set identified as satisfying the potential contextual inference; and outputting scene context information conveying the potential contextual inference responsive to a determination that the scene data and the subset of the context data training set satisfy a predetermined correlation.

In another example computer process of any preceding computer process, identifying the potential contextual inference further comprises identifying the potential contextual inference based on a memory association between the potential contextual inference and the at least one object.

In still another example computer process of any preceding computer process, the context data training set includes instances of context data pre-identified as satisfying or not satisfying each of a plurality of contextual inferences associated with different objects.

In still another example computer process of any preceding computer process, the potential contextual inference is a use context inference indicating viability of the identified object for a potential user-object interaction.

In still another example computer process of any preceding computer process, the potential contextual inference is a behavioral inference indicating a motivation for an action of a living object captured in the scene data.

In still another example computer process of any preceding computer process, comparing the scene data to the subset of the context data training set further comprises computing a confidence metric quantifying a likelihood that the scene data satisfies a correlation with the subset of the context data training set identified as satisfying the potential contextual inference; and outputting the scene context information responsive to a determination that the confidence metric satisfies a predetermined threshold.

An example device for contextual interpretation of a three-dimensional scene includes an object recognition engine and a contextual inference engine. The object recognition engine is stored in the memory and executable by the processor to analyze scene data collected from the three-dimensional scene to identify at least one object present in the three-dimensional scene. The contextual inference engine is trained on a context data training set, stored in memory, and executable by a processor to: identify a potential contextual inference associated in memory with the at least one object identified by the object recognition engine compare the scene data to a subset of the context data training set identified as satisfying the potential contextual inference; and output scene context information conveying the potential contextual inference responsive to a determination that the scene data and the subset of the context data training set satisfy a predetermined correlation.

An example device of any preceding device further includes at least one environmental sensor that collects the scene data from the three-dimensional scene.

In another example device of any preceding device, the potential contextual inference is a use context inference indicating viability of the identified object for a potential user-object interaction.

In still another example device of any preceding device, the potential contextual inference is a behavioral inference indicating a motivation for an action of a living object captured in the scene data.

In yet another example device of any preceding device, the contextual inference engine is further executable to: compute a confidence metric quantifying a likelihood that the scene data satisfies a correlation with the subset of the context data training set identified as satisfying the potential contextual inference; and output the scene context information conveying the potential contextual inference responsive to a determination that the computed confidence metric satisfies a predetermined threshold.

An example system for contextual interpretation of a three-dimensional scene comprises: a means for analyzing scene data collected from the three-dimensional scene to identify at least one object present in the three-dimensional scene; a means for identifying a potential contextual inference associated in memory with the at least one object identified; comparing the scene data to a subset of a context data training set identified as satisfying the potential contextual inference; and a means for outputting scene context information conveying the potential contextual inference responsive to a determination that the scene data and the subset of the context data training set satisfy a predetermined correlation.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A system for contextual interpretation of a three-dimensional scene, the system comprising:
   memory;
   a processor;
   an object recognition engine stored in the memory and executable by the processor to:
      analyze scene data collected from the three-dimensional scene to identify at least a first object and a second object present in the three-dimensional scene; and
   a contextual inference engine trained on a context data training set, the contextual inference engine stored in memory and executable by a processor to:
      identify a potential contextual inference associated in memory with a recognized spatial relationship between the first object and the second object;
      compare the scene data to a subset of the context data training set identified as satisfying the potential contextual inference; and
      output scene context information conveying the potential contextual inference responsive to a determination that the scene data and the subset of the context data training set satisfy a predetermined correlation.

2. The system of claim 1, wherein the potential contextual inference is a use context inference, the use context inference indicating viability of at least one of the first object and the second object for a potential user-object interaction.

3. The system of claim 1, wherein the potential contextual inference is a behavioral inference, the behavioral inference indicating a motivation for an action of a living object captured in the scene data.

4. The system of claim 1, wherein the contextual inference engine is further executable to:
   compute a confidence metric quantifying a likelihood that the scene data satisfies a correlation with the subset of the context data training set identified as satisfying the potential contextual inference; and
   output the scene context information conveying the potential contextual inference responsive to a determination that the computed confidence metric satisfies a predetermined threshold.

5. The system of claim 1, wherein context data training set includes instances of context data pre-identified as satisfying or not satisfying each of a plurality of contextual inferences.

6. The system of claim 1, wherein the system further comprises:
   at least one environmental sensor that collects the scene data from the three-dimensional scene.

7. The system of claim 1, wherein the context data training set includes sound data.

8. One or more computer-readable storage media of a tangible article of manufacture encoding computer-executable instructions for executing on a computer system a computer process for contextual interpretation of a three-dimensional scene, the computer process comprising:
   analyzing, with a processor, scene data collected from the three-dimensional scene to identify at least a first object and a second object present in the three-dimensional scene;
   identifying a potential contextual inference ssociated in memory with a recognized spatial relationship between the first object and the second object;
   comparing the scene data to a subset of a context data training set identified as satisfying the potential contextual inference; and
   outputting scene context information conveying the potential contextual inference responsive to a determination that the scene data and the subset of the context data training set satisfy a predetermined correlation.

9. The one or more computer-readable storage media of claim 8, wherein the context data training set includes instances of context data pre-identified as satisfying or not satisfying each of a plurality of contextual inferences associated with different objects.

10. The one or more computer-readable storage media of claim 8, wherein the potential contextual inference is a use context inference, the use context inference indicating viability of at least one of the first object and the second object for a potential user-object interaction.

11. The one or more computer-readable storage media of claim 8, wherein the potential contextual inference is a behavioral inference, the behavioral inference indicating a motivation for an action of a living object captured in the scene data.

12. The one or more computer-readable storage media of claim 8, wherein comparing the scene data to the subset of the context data training set further comprises:
   computing a confidence metric quantifying a likelihood that the scene data satisfies a correlation with the subset of the context data training set identified as satisfying the potential contextual inference; and
   outputting the scene context information responsive to a determination that the confidence metric satisfies a predetermined threshold.

13. A device for contextual interpretation of a three-dimensional scene, the device comprising:
   memory;
   a processor;
   an object recognition engine stored in the memory and executable by the processor to analyze scene data collected from the three-dimensional scene to identify at least a first object and a second object present in the three-dimensional scene; and
   a contextual inference engine trained on a context data training set, the contextual inference engine stored in memory and executable by a processor to:
   identify a potential contextual inference associated in memory with a recognized spatial relationship between the first object and the second object;
   compare the scene data to a subset of the context data training set identified as satisfying the potential contextual inference; and
   output scene context information conveying the potential contextual inference responsive to a determination that the scene data and the subset of the context data training set satisfy a predetermined correlation.

14. The device of claim 13, wherein the device further comprises:
   at least one environmental sensor that collects the scene data from the three-dimensional scene.

15. The device of claim 13, wherein the potential contextual inference is a use context inference, the use context inference indicating viability of at least one of the first object and the second object for a potential user-object interaction.

16. The device of claim 13, wherein the potential contextual inference is a behavioral inference, the behavioral inference indicating a motivation for an action of a living object captured in the scene data.

17. The device of claim 13, wherein the contextual inference engine is further executable to:
   compute a confidence metric quantifying a likelihood that the scene data satisfies a correlation with the subset of the context data training set identified as satisfying the potential contextual inference; and
   output the scene context information conveying the potential contextual inference responsive to a determination that the computed confidence metric satisfies a predetermined threshold.

18. The device of claim 17, wherein the context data training set includes sound data.

\* \* \* \* \*